United States Patent [19]

Takeda et al.

[11] Patent Number: 4,673,626

[45] Date of Patent: Jun. 16, 1987

[54] OPTICAL RECORDING CARD WITH OPTICAL RECORDING LAYERS

[75] Inventors: Mitsuru Takeda, Yokohama; Wataru Kuramochi, Kawagoe, both of Japan

[73] Assignee: Dai Nippon Insatsu Kabushiki Kaisha, Japan

[21] Appl. No.: 716,484

[22] Filed: Mar. 27, 1985

[30] Foreign Application Priority Data

| Mar. 31, 1984 | [JP] | Japan | 59-64590 |
| Mar. 31, 1984 | [JP] | Japan | 59-64591 |
| Apr. 10, 1984 | [JP] | Japan | 59-71582 |
| Apr. 10, 1984 | [JP] | Japan | 59-71583 |

[51] Int. Cl.[4] .................. G03C 1/62; G03C 1/72; G01D 15/14
[52] U.S. Cl. .................. 430/14; 430/11; 430/12; 430/15; 430/16; 430/153; 430/156; 430/141; 428/201; 428/203; 428/204; 428/206; 428/913; 346/76 L; 346/135.1
[58] Field of Search ........... 430/12, 156, 153, 14, 430/16, 15, 11, 141; 346/76 L, 135.1; 428/913, 201, 203, 204, 206

[56] References Cited

U.S. PATENT DOCUMENTS

| 2,702,243 | 2/1955 | Schmidt | 430/156 |
| 3,313,626 | 4/1967 | Whitney | 430/156 |
| 3,465,352 | 9/1969 | Carlson et al. | 346/76 |
| 3,506,442 | 4/1970 | Kerwin | 430/153 |
| 4,125,401 | 11/1978 | Spiertz et al. | 430/153 |
| 4,288,510 | 9/1981 | Tinet et al. | 430/14 |
| 4,312,938 | 1/1982 | Drexler et al. | 430/11 |
| 4,314,019 | 2/1982 | Adin et al. | 430/156 |
| 4,332,872 | 6/1982 | Zingher | 430/12 |
| 4,341,856 | 7/1982 | Toyama et al. | 430/156 |
| 4,343,879 | 8/1982 | Drexler et al. | 430/16 |
| 4,507,346 | 3/1985 | Mauer et al. | 428/211 |
| 4,579,754 | 4/1986 | Maurer et al. | 430/14 |
| 4,579,804 | 4/1986 | Takeuchi et al. | 430/153 |

FOREIGN PATENT DOCUMENTS 171952 9/1984 Japan .................. 430/145

OTHER PUBLICATIONS

D. Maydan, "Micromachining and Image Recording on Thin Films by Laser Beams", The Bell System Technical Journal, Jul.-Aug. 1971, pp. 1761-1789.
J. Drexler, "DREXON TM Optical Memory Media for Laser Recording and Archival Data Storage", J. Vac. Sci. Technol., vol. 18, No. 1, Jan./Feb. 1981, pp. 87-91.
A. E. Bell et al., Appl. Phys. Lett., 34, 275-276 (1979).
M. Takenaga et al., J. Appl. Phys. 54, 5376-5380 (1983).

Primary Examiner—Charles L. Bowers, Jr.
Attorney, Agent, or Firm—Parkhurst & Oliff

[57] ABSTRACT

An optical recording material comprising (I) a substrate, (II) a recording layer provided on said substrate, the recording layer consisting of light transmissive portions and light screening portions, and (III) a reflective metallic thin film layer provided on the recording layer; as well as a process therefor. The invention also includes an optical card comprising the optical recording material provided on a card substrate. In the cases of the optical recording material and the optical card, it is possible to readily carry out high density recording, the alternation of written information is difficult, and the written information can be read out on a basis of the difference in light reflectivity.

10 Claims, 9 Drawing Figures

OPTICAL RECORDING CARD WITH OPTICAL RECORDING LAYERS

BACKGROUND OF THE INVENTION

This invention relates to an optical recording material and a process therefor, and more particularly to an optical recording material having a first recording layer obtained by imagewise exposing a photosensitive material and a second recording layer or a reflective thin film layer, and a process therefor.

Heretofore, a magnetic material has been mainly used as a recording material embedded in cards such as a credit card and a bank card. In the case of this magnetic material, recording and readout of information can be readily carried out. However, the alternation of information is readily carried out, and it is impossible to carry out high density recording.

In order to solve such problems, there has been proposed an optical recording material wherein a photosensitive material is imagewise exposed to form light transmissive portions and light screening portions to write information in the photosensitive material, and this information is read out by the difference of optical transmittancy. When such an optical recording material is embedded in a card substrate to use it as a recording material for a card, there are the following problems.

(a) In many cases, various printing compositions are applied to the surface of the card substrate, and therefore preferably the card substrate is opaque. However, in order to imbed the optical recording material as described above, it is necessary that the substrate exhibits at least partial light transmission properties. This is significantly disadvantageous from the standpoint of the production of the card (b) In the case of the recording material as described above, it is difficult to sufficiently increase the difference in light transmission properties at the light transmissive portions and the light screening portions. Further, when the written information is intended to be read by the difference in transmittancy, soil on the surface of the card greatly affects readout.

Accordingly, an attempt has been made to read out information by the difference in optical reflectivity rather than transmittancy. For example, there have been proposed cards having a recording layer wherein silver particles are dispersed in a gelatin matrix. Writing of information in the recording layer is carried out by irradiating the recording layer with a laser beam to form recording pits. The recording layer can be continuously produced by a coating process, and uniform reflectivity can be obtained over a wide region of wavelength by using silver. Furthermore, it is possible to apply to a record playback apparatus wherein a laser beam having various wavelengths is used. However, when recording is carried out by a photographic process, it is difficult to simultaneously improve optical reflection and definition. For example, when the development time is increased, optical reflection is improved, but recording portions (exposed portions) tend to increase and definition may be lowered. On the contrary, when the development time is shortened, definition is improved, but light reflection may become poor. When readout is carried out, a contrast between recorded portions and non-recorded portions is not clear.

Further, there has also been provided a so-called heat mode recording material wherein a recording layer of recording material is irradiated with an energy beam such as a laser beam in the form of spots to change the state of part of the recorded layer thereby recording. Thin films of metals such as tellurium and bismuth, thin films of organic compounds such as polystyrene and nitrocellulose, films of tellurium low oxides (phase transition) or the like are used as the recording layer for use in the heat mode recording material. These recording materials do not require development treatment after writing of information, and are so-called DRAW (direct read after write) mdeia. It is possible to carry out high density recording, and it is also possible to carry out an additional writing. Accordingly, it is expected that use of this type of recording materials for discs or cards cn be increased.

Among these heat mode recording materials, the most widely used recording material is one wherein a thin film of metals such as tellurium and bismuth is vapor deposited on a substrate. In this recording material, writing of information is carried out by irradiating the metallic thin film with an energy beam such as a laser beam in the form of spots to remove the metal of irradiated portions by vaporization or fusing, thereby to form pits. Readout of information is carried out by irradiating the recording layer with a readout light and reading out the difference in reflectivity between the pit portions which are recording portions and metallic thin film which are non-recording portions. In writing information, in addition to the formation of the recording pits which correspond to information per se to be read out, it is necessary to write in the recording layer a tracking which corresponds to a guide groove for light as well as preformatting for specifying the pits to be read out.

However, metals such as tellurium and bismuth from which the recording layer is produced have toxicity to some extent, and therefore full care must be taken in handling. Further, the formation of pits by irradiation of an energy beam such as a laser beam requires high control technology. Furthermore, the pit formation steps are complicated and therefore the cost is not always low. Accordingly, if there is developed a recording material wherein a tracking corresponding to a guide groove for light as well as preformatting for specifying pits to be read out can be inexpensively formed in a large scale by simple processes other than laser beam irradiation, it is expected that such a recording material will have extremely high usefulness.

On the other hand, there have been proposed cards having a recording layer wherein silver particles are dispersed in a gelatin matrix. Writing of information in this recording layer is carried out by irradiating the recording layer with a laser beam to form pits. The recording layer can be continuously produced by a coating process, and the use of silver affords uniform reflectivity over broad wavelength regions. Further, it is possible a apply to record/playback apparatus wherein, a laser beam having various wavelength regions is used. However, such a recording layer is made of silver, and therefore the cost is high. Further, it is difficult to stably and inexpensively produce and supply due to fluctuation of the price of silver. Furthermore, the pattern formation and development treatment must be carried out in a dark place in certain cases.

SUMMARY OF THE INVENTION

The present invention aims at the solution of the problems accompanying the prior art while achieving the following objects.

(a) One object is to provide an optical recording material wherein it is possible to carry out high density recording and the alteration of written information is difficult; an optical card; as well as a process for preparing the optical recording material.

(b) Another object is to provide an optical recording material wherein the written information can be read out on a basis of the difference in light reflectivity; an optical card; as well as a process for preparing the optical recording material.

(c) A further object is to provide an optical recording material wherein writing of information in a recording layer can be carried out by mass productive processes such as imagewise exposure without using a laser beam; an optical card; as well as a process for preparing the optical recording material.

(d) A further object is to provide an optical recording material wherein writing of tracking as well as preformatting for readout of recording pits corresponding to the information per se to be read out can be formed without any irradiation of an energy beam and therefore the production steps can be simplified and a mass production and a decrease in cost can be achieved; an optical card; as well as a process for producing the optical recording material (e) A still further object is to provide an optical recording material capable of being supplied and inexpensively; an optical card; as well as a process for preparing the optical recording card.

An optical recording material according to the present invention comprises (I) a substrate, (II) a recording layer provided on the substrate, the recording layer consisting of light transmissive portions and light screening portions, and (III) a reflective metallic thin film layer provided on the recording layer, wherein readout of information written in the recording layer and/or the metallic thin film layer is carried out by irradiating the optical recording material with a record playback light from the recording layer-free side of the substrate.

An optical recording material of a first embodiment according to the present invention comprises (I) a substrate, (II) a first recording layer provided on the substrate, the first recording layer consisting of light transmissive portions and light screening portions, and (III) a second recording layer provided on the first recording layer, the second recording layer consisting of a reflective thin film layer, wherein information is written in the second recording layer by irradiating the second recording layer with an energy beam in the form of spots, and wherein readout of the written information is carried out by exposing to a record playback light from the side provided with no first and second recording layers. The optical recording material of the first embodiment is in such a state that writing of information in the second recording layer is not yet carried out.

An optical recording material of a second embodiment according to the present invention comprises (I) a substrate, (II) a first recording layer provided on the substrate, the first recording layer consisting of light transmissive portions and light screening portions, and (III) a second recording layer provided on the first recording layer, the second recording layer consisting of a reflective metallic thin film layer having recording pits formed therein, wherein readout of the written information is carried out by exposing to a record playback light from the side provided with no said first and second recording layers. The optical recording material of the second embodiment is in such a state that writing of information in the second recording layer has been already carried out.

In a third embodiment according to the present invention, information cannot be written in said metallic thin film layer and readout of information written in said recording layer is carried out by irradiating the optical recording material with a record playback light from the recording layer-free side of the substrate.

A process for preparing an optical recording material according to the present invention comprises the steps of applying onto a substrate a photosensitive material wherein any one of exposed portions and unexposed portions exhibits light transmission properties and the other exhibits light screening properties; then imagewise exposing the substrate provided with the photosensitive material; developing it to form a recording layer; and thereafter forming a reflective metallic thin film layer on the recording layer.

A process for preparing an optical recording material of one embodiment according to the present invention comprises the steps of providing on a substrate a layer of photosensitive material wherein any one of exposed portions and unexposed portions exhibits light transmission properties and the other exhibits light screening properties; then imagewise exposing the substrate provided with the photosensitive material; developing it to form a first recording layer; then forming a reflective metallic thin film layer on the first recording layer; and thereafter irradiating the reflective metallic thin film layer with an energy beam to form recording spots thereby forming a second recording layer.

DETAILED DESCRIPTION OF THE INVENTION

Figure 1:
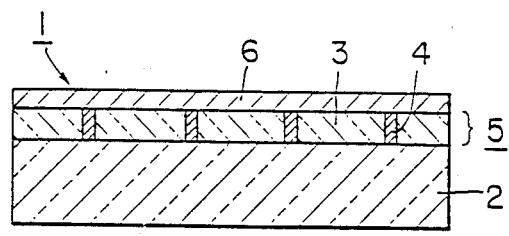
FIG. 1 is a sectional view of an optical recording material according to the present invention.

Preferred embodiments of an optical recording material according to the present invention will now be described with reference to the drawing.

An optical recording material 1 according to the present invention comprises a substrate 2; a recording layer 5 provided on the substrate 2, the recording layer consisting of light transmissive portions 3 and light screening portions 4; and a reflective metallic thin film layer 6 provided on the recording layer 5.

According to one embodiment, the recording layer is a first recording layer and the metallic thin film layer is a second recording layer capable of writing information by irradiating it with an energy beam.

According to another embodiment, the recording layer is a first recording layer and the metallic thin film layer is a second recording layer having substantially circular, elliptic or rectangular recording pits formed therein.

According to another embodiment, information can be written in the recording layer, but not the metallic thin film layer.

Examples of the substrate 2 which can be used in the present invention are any type of materials such as glasses, ceramics, papers, plastic films, woven fabrics and non-woven fabrics From the standpoints of productivity and smoothness, glasses and plastic films are preferred. Examples of plastics which can be used in the present invention are cellulose derivatives, polyester resins, polycarbonate resins, vinylic resins, polyimide resins, acrylic resins such as polymethyl methacrylate, polyether resins, polysulfone resins, polyamide resins, polymethyl pentene resins ahd cellulose triacetate resins. From the standpoints of transparency and smoothness, cellulose triacetate, polyethylene terephthalate, polycarbonate, acryl polyvinyl chloride, polysulfone, polymethyl pentene resins and the like are particularly preferred. The substrate 2 may be subjected to pretreatments for improving adhesion, such as corona discharge treatment, plasma treatment and primer treatment.

The first recording layer 5 comprises light transmissive portions 3 and light screening portions 4. The first recording layer 5 is formed, for example, by imagewise exposing a photosensitive material wherein unexposed portions exhibit light transmission properties and exposed portions exhibit light screening properties, and then developing. Optionally, the first recording layer may be formed by imagewise exposing a photosensitive material wherein unexposed portions exhibit light screening properties and exposed portions exhibit light transmission properties, and then developing.

The photosensitive material comprises, for example, (a) a transparent resin as a binder, (b) a photodecomposable development restrainer having a diazo or azido group, and (c) a metal complex compound or metal compound which is reduced to form metal developing nuclei. This material is called a non-silver photosensitive material. In such photosensitive materials, the photodecomposable development restrainer having a diazo or azido group is present in an amount of from 1 to 100 parts by weight, preferably from 20 to 50 parts by weight per 100 parts by weight of the transparent resin as the binder, and the metal complex compound or metal compound which is reduced to form a metal developing nucleus is present in an amount of from 0.1 to 100 parts by weight, preferably from 1 to 10 parts by weight per 100 parts by weight of the transparent resin as the binder. While the development restrainer and the metal complex compound or metal compound described above are dissolved or dispersed in the transparent resin as the binder, they are preferably dissolved therein Any lipophilic or hydrophilic transparent resin can be used as the transparent resin. The lipophilic transparent resins include resins having an ester group such as polyvinyl acetate resins, vinyl acetate/acrylic ester copolymer resins, acrylic acid/vinyl acetate copolymer resins, ethylene/vinyl acetate copolymer resins; resins having a hydroxyl group such as cellulose acetate; modified vinyl acetate resins having a carboxyl group or a sulfonate group.

Further, the incorporation of cellulose derivatives such as nitrocellulose wherein optical recording characteristics are changed in a heat mode, into these lipophilic transparent resins is effective for increasing sensitivity.

Examples of hydrophilic transparent resins for use herein are natural polymeric materials such as gelatin, casein, glue, gum arabic, and shellac; carboxymethyl cellulose; egg albumin; and synthetic resins such as polyvinyl alcohol (partially saponified polyvinyl acetate), polyacrylic acid, polyacrylamide, polyvinyl pyrrolidone, polyethylene oxide, and maleic anhydride copolymer. Other resins can be used so long as they are water-soluble or hydrophilic resins. Preferably, the hydrophilic transparent resin as the binder has such a hydrophilicity that, in contacting a transparent resin-based photosensitive material layer with a physical developing solution, the physical developing solution can penetrate the photosensitive material layer to carry out physical development.

Low molecular weight compounds such as nitrocellulose wherein optical recording characteristics are changed in a heat mode can be dissolved in ethanol and the resulting solution is effectively incorporated in the hydrophilic resin described above.

A compound having a diazo or azido ground is used as the development restrainer. Preferred compounds having a diazo group are zinc chloride double salts or borofluorides having a diazo group, and the condensation product of these compounds and paraformaldehyde. Specific examples of the compounds which can be used in the invention are zinc chloride double salts having a diazo group such as p-N,N-diethylaminobenzenediazonium zinc chloride double salt, p-N-ethyl-N-β-hydroxyethylaminobenzenediazonium zinc chloride double salt, 4-morpholino-2,5-diethoxybenzenediazonium zinc chloride double salt, 4-morpholino-2,5-dibutoxybenzenediazonium zinc chloride double salt, 4-benzoylamino-2,5-diethoxybenzenediazonium zinc chloride double salt, 4-(4'-methoxybenzoylamino)-2,5-diethoxybenzenediazonium zinc chloride double salt, 4-(p-toluylmercapto)-2,5-dimethoxybenzenediazonium zinc chloride double salt, 4-diazo-4'-methoxydiphenylamine zinc chloride double salt, and 4-diazo-3-methoxy-diphenylamine zinc chloride double salt; borofluorides, sulfates and phosphates wherein zinc chloride in such compounds is replaced by borofluoride, sulfate and phosphate groups.

Examples of the compounds having an azido group which can be used in the present invention are p-azidoacetophenone, 4,4'-diazidochalcone, 2,6-bis(-4'azidobenzal)-acetone, 2,6-bis(4'-azidobenzal)-cyclohexanone, 2,6-bis(4'-azidobenzal)-4-methylcyclohexanone, 2,6-bis(4'-azidostyryl)-acetone, and azidopyrene. Other compounds can be also used so long as they have a diazo or azido group. The above compounds having a diazo or azido group can be also optionally used in combination of two or more compounds.

When the compound having a diazo group is used, it is preferable to use a stabilizer which stabilizes the compound. Organic carboxylic acids and organic sulfonic acids can be used as the stabilizer. It is practically preferable to use p-toluenesulfonic acid or the like.

The metal complex compound or metal compounds which are reduced to form metal development nuclei will be described hereinafter. Complex compounds of metals such as palladium, gold, silver, platinum and copper are used as the metal complex compounds which are reduced to form metal development nuclei. The conventionally known ligands can be used as the ligands which are electron donors against these metals. Specific examples of the metal complex compounds for use herein are as follows: bis(ethylenediamine) palladium (II) salt, dichloroethylenediaminepalladium (II) salt, dichloro (ethylenediamine) platinum (V) salt, tetrachlorodiamineplatinum (IV) salt, dichlorobis(ethylenediamine) platinum (IV) salt, tetraethylammonium copper (II) salt, and bis(ethylenediamine) copper (II) salt.

When so-called chelating agents which coordinate at two or more positions to form a ring structure are used as the ligands which form the metal complex compounds, the stability of the resulting metal complex compounds is high and therefore the use of such chelating agents is suitable. The chelating agents include primary, secondary and tertiary amines, oximes, imines, and ketones Specific examples of suitable chlating agents for use herein are compounds such as dimethylglyoxime, dithizone, oxine, acetylacetone, glycine, ethylenediaminetetraacetic acid, nitrilotriacetic acid and uracildiacetic acid.

Preferred chelating agent-containing metal complex compounds are bis(2,2'-bipyridine) palladium (II) salt, bis(acetylacetanato) palladium (II), bis(N,N-diethylethylenediamine) copper (II) salt, bis(2,2'-bipyridine) copper (II) salt, bis(1,10-phenanthroline) copper (II) salt, bis(dimethylglyoximato) copper (II), bis(acetylacetonato) copper (II), bis(acetylacetonato) platinum (II).

Metal compounds such as water-soluble salts such as chlorides and nitrates of metals such as palladium, gold, silver, platinum and copper are used as the metal compounds which are reduced to form metal developing nuclei. Specific examples of suitable metal compounds are salts such as palladium chloride, silver nitrate and gold hydrogen tetrachloride contained in an activator solution for electroless plating. Of these, palladium salts are particularly preferred.

The components as described above, i.e., (a) the transparent resin as the binder, (b) the photodecomposable development restrainer having a diazo or azido group and (c) the metal complex compound or metal compound which is reduced to form metal developing nuclei are mixed with a solvent selected depending upon the transparent resin as the binder to prepare coating solution for forming a photosensitive material layer having a viscosity suitable for application, i.e., from 10 to 1000 centipoises. This coating solution for forming the photosensitive material layer is applied onto the substrate 2 to a film thickness of from 0.1 to 30 micrometers thereby to form a layer of photosensitive material.

A variety of solvents can be used as the solvents which dissolve the transparent resin as the binder. When the hydrophilic transparent resin is used, water, water-miscible solvents or mixtures of water and water-miscible solvents such as lower alcohols, ketones, and ethers can be used. When the lipophilic transparent resin is used, solvents having high polarity such as methyl cellosolve, lower alcohols such as methyl alcohol, ethyl alcohol and isopropyl alcohol, ketones such as acetone and methyl ethyl ketone, and esters such as ethyl acetate and n-butyl acetate are preferably used.

When the hydrophilic transparent resin is used, it is desirable to carry out film-hardening treatment after formation of the photosensitive material layer in order to prevent the binder from eluting in the developing solution during physical development treatment. The film-hardening treatment can be carried out, for example, by premixing the following compounds in the coating solution for forming the photosensitive material in an amount of from 0.1 to 50 parts per 100 parts of the transparent resin, or by applying an aqueous solution of the following solution onto the previously formed layer of photosensitive material Al compounds such as potash alum and ammonium alum; Cr compounds such as chromium alum and chromium sulfate; aldehydes such as formaldehyde, glyoxal, glutaraldehyde, 2-methylglutaraldehyde, and succinaldehyde; diketones such as o-benzoquinone, p-benzoquinone, cyclohexane-1,2-dione, cyclopentane-1,2-dione, diacetyl, 2,3-pentanedione, 2,5-hexanedione, and 2,5-hexenedione; epoxides such as triglycidylisocyanurate; acid anhydrides such as tetraphthaloyl chloride, and 4,4'-diphenylmethanedisulfonyl chloride; tannic acid, gallic acid, 2,4-dichloro-6-hydroxy-s-triazine, phosphorus compounds represented by the general formulae: $R_2NPOX_2$, $(R_2N)_nPOX_{3-n}$,

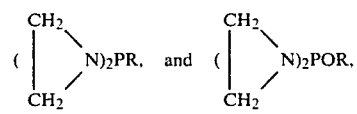

and carbodiimide represented by the general formula: $R-N=C=N-R'$ wherein R is an alkyl group containing from 2 to 6 carbon atoms, R' is a $(CH_3)_3N^+(CH_3)_3X^-$ group, X is F or Cl, and n is 1 or 2; resins such as styrene/maleic acid copolymer, vinyl pyrrolidone/maleic acid copolymer, vinyl methyl ether/maleic acid copolymer, ethyleneimine/maleic acid copolymer, methacrylic acid/methacrylonitrile copolymer, polymethacrylamide and methacrylic ester copolymer; glutaric acid, succinic acid, malic acid, lactic acid, citric acid, aspartic acid, glycolic acid, tartaric acid and the like.

The photosensitive material layer provided on the substrate 2 is imagewise exposed and then developed to form a recording layer 5 consisting of light transmissive portions 3 which are unexposed portions and light screening portions 4 which are exposed portions. The imagewise exposure can be carried out, for example, via a mask such as a photomask.

Also, an irradiation light can be focused in the form of a beam and the photosensitive layer can be directly irradiated with the focused light to form the light screening portions 4 in the form of patterns.

Image information derived from the light transmissive portions 3 and light screening portions 4 of the recording layer 5 acts as a tracking and a preformat in reading out information.

At the exposed portions of the photosensitive material layer, the photodecomposable development restrainer having the diazo or azido group decomposes depending upon the amount of exposure to form a latent image.

Any light source can be used as a light source used during exposure provided that the light source can decompose the compound having the diazo or azido group. Usually, an ultra-high pressure mercury vapor lamp is preferably used.

The latent image formed by the decomposition of the compound having the diazo or azido group by means of the imagewise exposure as described above is brought into contact with an aqueous solution of a reducing agent to generate metallic developing nuclei. At the unexposed portions, the development restrainer having the diazo or azido group is not decomposed and therefore no metallic developing nuclei are generated even if it is brought into contact with the aqueous solution of the reducing agent. Thus, the unexposed portions remain as the light transmissive portions intact.

Examples of suitable reducing agents for use herein are stannous chloride, stannous sulfate, sodium boron hydride; borazane compounds such as dimethylaminoborazane, diethylaminoborazane, and trimethylaminoborazane; borane compounds such as borane, diborane and methyldiborane; and hydrazine. Of these, an acidic stannous chloride solution, a stannous sulfate solution (weiss solution) and a commercially available sensitizer solution for electroless plating are particularly preferred. In general, any reducing agent can be used provided that it is a strong reducing agent.

The metallic developing nuclei thus obtained are then brought into contact with a physical developing solution to reduce the metal contained in the physical developing solution. Thus, the metal deposits around the metallic developing nucleus described above to form light screening portions 4.

An aqueous solution containing a water-soluble reducible metallic salt and a reducing agent is in the physical developing solution in a cool state or a warm state as needed.

Water-soluble salts of nickel, cobalt, iron, the group VIb metals such as chromium, and the group Ib metals such as copper are used alone or in admixture as the reducible metallic salt. Once the physical development is carried out with a solution of a copper salt, and thereafter a stannous chloride or tin sulfate plating can be carried out to substitute it for the copper salt. Thus, it is possible to obtain a metallic layer of tin or tin-copper. Of these, nickel, copper and tin are preferred from the standpoints of safety and storage properties. Unlike vapor deposition, a small amount of foreign metals and elements such as phosphorus and sulfur from the impurities of the raw material and plating stabilizers may be admixed. However, they do not substantially affect the characteristics of the optical recording material.

Specific examples of suitable water-soluble reducible metallic salts for use herein are heavy metal halides such as cobaltous chloride, cobaltous iodide, ferrous bromide, ferrous chloride, chromic bromide, chromic iodide and cupric chloride; heavy metal sulfates such as nickel sulfate, ferrous sulfate, cobaltous sulfate, chromic sulfate, and cupric sulfate; heavy metal nitrates such as nickel nitrate, ferrous nitrate, cobaltous nitrate, chromic nitrate and cupric nitrate; and organic acid salts of metals such as ferrous acetate, cobaltous acetate, chromic acetate, and cupric formate.

It is preferable that these reducible heavy metal salts be present in the physical developing solution, for example, at a level of from 10 to 100 grams per liter.

Examples of the reducing agents for use herein are hypophosphorous acid, sodium hypophosphite, sodium boron hydride, hydrazine, formalin, diethylaminoborane, dimethylaminoborane, trimethylaminoborane, borane, diborane, methyldiborane, diborazane, borazene, borazine, t-butylaminoborazane, pyridineborane, 2,6-lutidineborane, ethylenediamineborane, hydrazinediborane, dimethylphosphineborane, phenylphosphineborane, dimethylarsineborane, phenylarsineborane, dimethylstibineborane, and diethylstibineborane.

It is preferable that these reducing agents be present in the physical developing solution, for example, at a level of from 0.1 to 50 grams per liter In order to prevent a heavy metal ion formed by the dissolution of the reducible heavy metal salt described above from precipitating as a hydroxide, one or more complexing agents selected from the group consisting of organic carboxylic acids such as monocarboxylic acids, dicarboxylic acids, hydroxycarboxylic acids such as malic acid and lactic acid, succinic acid, citric acid, aspartic acid, glycol acid, tartaric acid, ethylenediaminetetraacetic acid, gluconic acid, saccharic acid and quininic acid can be incorporated in the physical developing solution. It is preferable that these complexing agents be present in the physical developing solution, for example, at a level of from 1 to 100 grams per liter.

In order to improve the storage properties and operability of the developing solution, as well as the quality of the resulting image, pH adjusting agents such as acids and bases, buffers, preservatives, whitening agents, surfactants or the like can be optionally incorporated in the physical developing solution according to the conventional methods.

Of these additives, ammonium aqueous solution or sodium hydroxide aqueous solution is particularly preferably used in order to raise pH.

The physical development may be carried out in a 65°–90° C. high temperature nickel plating bath using a sodium hypophosphite reducing agent or the same bath under high-speed plating conditions. The resulting image can also be treated for about 5 minutes with, for example, a 5% aqueous solution of hydrochloric acid or nitric acid to selectively remove a portion of the transparent resin of the light transmissive portions.

In addition to the system consisting of the transparent resin, the development restrainer and the metal complex compound or metal compound, the photosensitive materials which can be used in the present invention are (a) silver salt materials represented by silver halides and organic silver salt such as Dry Silver (registered trade mark), (b) a binary system of a diazonium salt and a coupler, (c) diazo materials represented by Kalvar Film (registered trade mark) and PD Process material (registered trade mark), (d) photopolymerization crosslinking-type photopolymer materials represented by acrylic monomers and polyvinyl cinnamic acid, (e) electrophotographic photoreceptors or its transfer products such as CdS, ZnO and polyvinyl carbazole which form a toner image, (f) electrophotographic materials such as thermoplastic electrophotographic photoreceptors which form a frost image, (g) a binary system of a leuco dye and carbon tetrabromide, (h) a binary system of a Dylux (registered trade mark) cobalt complex and a leuco dye, (i) a binary system of ferric oxalate and an iron salt, and (j) materials such as spiropyranes and molybdenum-tungsten compounds which form an image of pigments or dyestuffs.

In the cases of some of the photosensitive materials described above, the exposed portions exhibit light screening properties and the unexposed portions, exhibit light transmission properties. In these cases, the exposed portions exhibit light transmission properties and the unexposed portions exhibit light screening properties. Any photosensitive materials can be used provided that they are those capable of carrying out recording consisting of light transmissive portions and light screening portions by optionally developing after exposure.

Ultraviolet rays, visible rays, infrared rays, X-rays, electron beams and the like can be used as a light irradiated to such photosensitive material.

Although CCD is commercially available and easy to obtain, it cannot read a diazo image (visual recognition is possible) because of its infrared ray transmissive property which results from that the range of wavelength sensitivity of CCD is within the infrared area. In contrast, a non-silver photosensitive material can read the image.

Also, CCD can read an ordinary photofilm using silver; however, any material using silver must be usually handled only in a dark room. On the other hand, a non-silver photosensitive material is advantageous because it can be handled even in a light room and has a high resolving power.

Another advantage of a non-silver photosensitive material is that a solvent type photosensitive material layer composition can be used, depending upon its components used, resulting in easy drying after coating. The nonsilver photosensitive material has all the advantages mentioned above.

A reflective metallic thin film layer 6 is then formed on the thus formed recording layer 5 consisting of the light transmissive portions 3 and light screening portions 4.

The reflective metallic thin film layer is formed using metals which form pits during heating such as Cr, Ti, Fe, Co, Ni, Cu, Ag, Au, Ge, Al, Mg, Sb, Te, Pb, Pd, Cd, Bi, Sn, Se, In, Ga and Rb, alone or in combination of two or more metals. When the reflective metallic thin film layer 6 is used as a second recording layer to further write information therein by irradiation of an energy beam, it is preferable to use low melting metals such as Te, Zn, Pb, Cd, Bi, Sn, Se, In, Ga, and/or Rb as a main component. Alloys such as Te-Se, Te-Se-Pb, Te-Pb, Te-Sn-S, Sn-Cu, Te-Cu, and Te-Cu-Pb are particularly preferred.

Of these alloys, a Te-Cu alloy containing from 5 to 40 atomic percent of Cu, and a Te-Cu-Pb alloy containing from 5 to 40 atomic percent of Cu and from 1 to 50 atomic percent of Cu of Pb are particularly preferred when the wavelength of an irradiation energy beam for readout is set at 650 nanometers or higher. When the reflective metallic thin film layer made of these alloys is used as the second recording layer, recording pits exhibiting little turbulence at the periphery are obtained. Further, when the wavelength of the irradiation energy beam for readout is at least 650 nanometers, particularly from 700 to 900 nanometers, the ratio of the reflectivity of pits which are recording portions to that of metallic thin films which are unrecording portions, i.e., relative reflectivity is small. Thus, a reflective metallic thin film having excellent information readout characteristics is obtained.

When Sn-Cu alloys containing from 1 to 40 atomic percent of Cu are used, a reflective metallic thin film exhibiting little turbulence of the peripheral portion of recording pits and low toxicity is obtained.

When the reflective metallic thin film layer 6 is simply used as a reflective layer without writing any information, it is preferable that the reflective metallic thin film layer be formed from metals or alloys having particularly excellent light reflection such as Al, Cr, Ni, Ag and Au.

In order to form such a reflective metallic thin film layer on the recording layer, the metal or alloy as described above is provided and may be applied onto the recording layer by the previously known processes such as sputtering, vacuum deposition, ion plating and electroplating to form a thin film thereon. It is preferable that the film thickness of the reflective metallic thin film layer be from 200 to 10,000 Å, preferably 1,000–5,000 Å. Optionally, a multilayer film composed of the metal described above, such as a multilayer film of an In film and a Te film can be used as the reflective metallic thin film. Thin films composed of composite materials of the above metal and an organic compound or inorganic compound, for example, thin films such as Te-$CH_4$, Te-$CS_2$, Te-styrene, Sn-$SO_2$, GeS-Sn and SnS-S, and multilayer films such as $SiO_2$/Ti/$SiO_2$/Al can be used as the reflective metallic thin film.

Further reflective metallic thin films which can be used in the present invention are a thin film wherein light reflectivity is imparted by cohering dystuffs such as cyanine; a thin film wherein dyestuffs or metal particles such as silver are dispersed in thermoplastic resins such as nitrocellulose, polystyrene and polyethylene; a thin film wherein dyestuffs or metal particles are adhered to the surface of such thermoplastic resins, and the like.

The reflective metallic thin films can be composed of further compounds wherein phase transition occurs by irradiation of an energy beam to vary its reflectivity, such as Te oxide, Sb oxide, Mo oxide, Ge oxide, V oxide, Sm oxide, Te oxide-Ge, and Te-Sn.

Chalcogens, color formation-type $MoO_3$-Cu and $MoO_3$-Sn-Cu can be used as the material for the reflective metallic thin film, and optionally multilayer products of a foam formation-type organic thin film and a metallic thin film can be also used as the reflective metallic thin film.

Further, optomagnetic recording materials such as GdCo, TbCo, GdFe, DyFe, GdTbFe, GdFeBi, TbDyFe and MnCuBi can be used as the material for the reflective metallic thin film.

The reflective metallic thin films of various types as described above can be used in combination.

The reflective metallic thin film layer can be provided on the recording layer together with a separate substrate on which said thin film layer is provided, instead of providing directly on the recording layer.

Writing of information in the reflective metallic thin film layer as described above and readout of information written in the optical recording material according to the present invention will now be described.

Writing of information in the reflective metallic thin film layer is carried out by focusing an energy beam such as a laser beam having a wavelength of from 300 to 1100 nanometers by means of a lens or the like onto the metallic thin film layer to irradiate it with the energy beam, and vaporizing or segregating the metal of the irradiated portions to form spots, for example pits.

Alternatively, said writing is carried out by forming a spot by color change or phase change of said reflective thin film layer. Preferably, the intensity of the energy beam is from 0.1 to 100 mW, the pulse width is 5 nanoseconds to 500 milliseconds, and the diameter of the beam is from 0.1 to 100 micrometers.

A laser beam such as a semiconductor beam, an argon laser, a helium-neon laser, infrared flash and the like can be used as the energy beam irradiated onto the reflective metallic thin film layer.

On the other hand, readout of information written in the optical recording material according to the present invention is carried out by focusing an energy beam, a white light or a tungsten light having such a low energy level that it does not melt the reflective metallic thin film layer, onto the (first) recording layer consisting of the light transmissive portions and the light screening portions and/or metallic thin film layer acting as the (second) recording layer according to the necessity, having recording pits via a lens or the like from the recording layer-free side of the substrate to irradiate them with the energy beam or the light, and detecting the intensity of a reflected light in connection with the phase shift.

As described above, when the non-silver photosensitive material is used, at the light screening portions of the recording layer, metal deposits in the vicinity of the metal developing nuclei as a center to form a tone similar to a black. Accordingly, when the light screening portions are irradiated with an irradiation beam for readout, the irradiation beam is absorbed at such portions to decrease the reflectivity. On the other hand, at the light transmissive portions, the irradiation beam is not very absorbed and reaches the reflective metallic thin film layer. Accordingly, the reflectivity at the light transmissive portions is a large value.

The metallic thin film layer corresponding to the unrecording portions of the reflective metallic thin film layer, when it acts as the second recording layer, exhibits high reflectivity, whereas the pit portions corresponding to the recording portions exhibit low reflectivity.

Thus, information written in the optical recording material according to the present invention can be read out by reading out the difference in reflectivity between the light screening portions and light transmissive portions of the first recording layer, and/or the difference in reflectivity between the pit portions and unrecording portions of the second recording layer.

In addition to cards such as a credit card and a bank card, the optical recording material according to the present invention can be employed in uses such as a license, medical control records such as a clinical chart, a passport, a dictionary for a word processor, a check for travel, and a soft package for a computer.

Because the optical recording material according to the present invention has the first recording layer consisting of the photosensitive material layer, and the second recording layer consisting of the reflective thin film layer, it has the following effects or advantages.

(a) It is possible to carry out far higher density recording as compared with the magnetic recording material, and it is significantly difficult to alter the written information.

(b) When writihg of information in the reflective thin film layer is carried out, said information written therein can be readout on the basis of the difference in light reflectivity.

(c) Writing of information in the recording layer can be carried out by mass productive processes such as imagewise exposure without using any laser beam.

(d) When the system consisting of the transparent resin, the development restrainer and the metal complex compound or metal compound is used as the photosensitive material, the operation can be carried out in a light room.

The present invention also provides an optical card having such an optical recording material.

An optical card according to the present invention comprises an optical recording material provided on a card substrate, the optical recording material comprising (a) a substrate for an optical recording material, (b) a recording layer provided at the lower surface of the substrate for the optical recording material, the recording layer consisting of light transmissive portions and light screening portions, and (c) a reflective thin film layer provided at the lower surface of the recording layer, wherein the optical recording material is provided on the card substrate so that the thin film layer comes into contact with the card substrate.

In the optical recording material secured to the optical card, information has been already written in the recording layer thereof. In order to further write information in the thin film layer, the thin film layer may be irradiated with an energy beam in the form of spots. Readout of the information written in the recording layer and/or thin film layer is carried out by irradiating the optical card with a record playback light from the side of the substrate for the optical recording material and detecting the intensity of a reflected light in connection with the phase shift.

Optical cards according to the present invention will now be described by embodiments shown in the drawings wherein a portion of members is enlarged for the convenience of description. Reference numerals of members common to FIG. 1 are represented by the same reference numbers as those of FIG. 1, in FIGS. 2–4.

Figure 2:
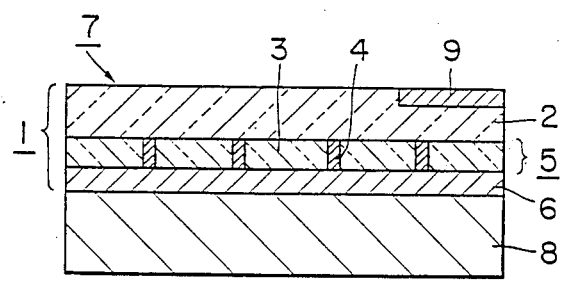
FIGS. 2 through 6 are sectional views of embodiments of an optical card according to the present invention.

FIG. 2 is a sectional view of an optical card according to the present invention. The optical card 7 comprises an optical recording material 1 provided on a card substrate 8. This optical recording material 1 comprises (a) a substrate 2 for the optical recording material, (b) a recording layer 5 provided at the lower surface of the substrate, the recording layer consisting of light transmissive portions 3 of light screening portions 4, and (c) a reflective metallic thin film layer 6 provided at the lower surface of the recording layer 5. The optical recording material is provided on the card substrate 8 so that metallic thin film layer 6 comes into contact with the card substrate 8. Optionally, a magnetic recording layer 9 may be provided on the surface of the optical card 7. If necessary, IC memory, photographs, engraved images, letters, marks, relief letters referred to as imprint or the like may be provided on the surface of the optical card. Thus, it is possible to cope with various playback systems by one card, and forgery can be more effectively prevented.

Figure 3:
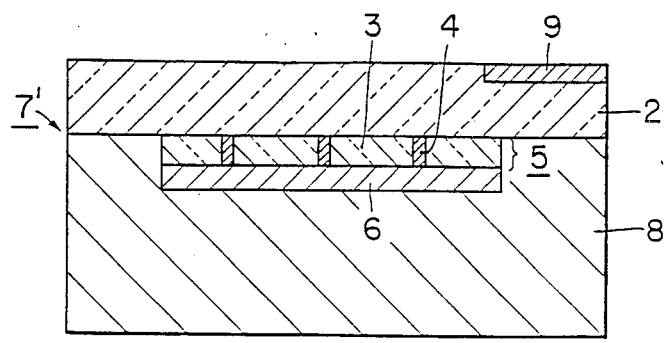

FIG. 3 in a sectional view of another embodiment of an optical card 7'. The optical card 7' shown in FIG. 3 comprises a recording layer 5 and a metallic thin film layer 6 provided on a portion of the surface of a substrate 2 for an optical recording material rather than the entire surface thereof.

Any material which can be used as a conventional card substrate can be used as the card substrate 8. Specific examples of the materials from which the card substrate is produced are polyvinyl chloride, vinyl chloride/vinyl acetate copolymer, polyvinylidene chloride, acrylic polymers such as polymethyl methacrylate, polystyrene, polyvinyl butyral, acetylcellulose, styrene/butadiene copolymer, polyethylene, polypropylene, polycarbonate, and the like. Optionally, sheets of metals such as iron, stainless steel, aluminum, tin, copper, and zinc, synthetic papers, papers and the like can be used. The laminates of the materials as described above can be used. The optical recording material for use herein is as described above in detail.

An optical card according to the present invention is produced as follows:

First, as described above, a recording layer and a metallic thin film layer are provided on a substrate for an optical recording material to form an optical recording material. When the substrate for the optical recording material is incorporated in an optical card, it also acts as a card protective layer.

The card substrate and the substrate for the optical recording material are then laminated via an adhesive layer such as a hot-melt adhesive or a thermosetting adhesive so that the metallic thin film layer of the optical recording material comes into contact with the card substrate. The laminate is then pressed by a heated roll at about 90°–150° C. or the like to produce an optical card.

Optionally, an optical card can also be produced as follows: a recording layer containing a hydrophilic resin as a binder and a reflective metallic thin film layer are provided on a substrate for an optical recording material. A protective film of acrylic resins or the like is applied to the reflective metallic thin film layer by a screen printing process or the like to impart waterproof properties to such portions. In this case, the protective film is not provided at the periphery of the substrate for the optical recording material. This optical recording material is then immersed in warm water to remove the hydrophilic resin present at the protective layer-free portions, and thereafter dried.

On the other hand, a concave for embedding the recording layer and metallic thin film layer of the optical recording material is formed in the card substrate such as white polyvinyl chloride films by a hot pressing process or the like, and an adhesive layer is affixed to the surface of the card substrate.

The optical recording material and the card substrate are then laminated so that the metallic thin film layer of the optical recording material comes into contact with the card substrate, and pressed by means of a heated roll or the like to produce an optical card.

An optical card of the present invention can also be produced by providing on a card substrate an optical recording material and a card protective layer in this order.

Figure 4:
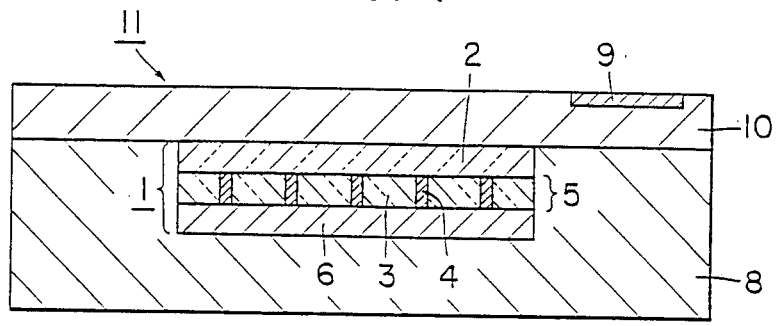

An optical card 11 shown in FIG. 4 comprises a card substrate 8, an optical recording material 1 embedded in the card substrate 8 and a card protective layer 10 provided on these members. This optical recording material comprises (a) a substrate 2 for an optical recording material, (b) a recording layer 5 provided at the lower surface of the substrate, the recording layer consisting of light transmissive portions 3 and light screening portions 4, and (c) a reflective metallic thin film layer 6 provided at the lower surface of the recording layer 5. The optical recording material is provided on the card substrate 8 so that the metallic thin film layer 6 comes into contact with the card substrate 8.

Optionally, a magnetic recording layer 9 may be provided on the surface of the optical card 11. IC memory, photographs, engraved images, letters, marks, relief letters referred to as imprint, or the like may also be provided on the surface of the optical card.

Any materials which can be used as a conventional protective layer (overcoat) can be used as the card protective layer 10 so long as they have light transmission properties. Specific examples of the materials which can be used in the present invention are films of resins such as polyvinyl chloride, polyethylene terephthalate, polyethylene, polypropylene, polystyrene, and polycarbonate.

Such an optical card can be produced as follows:

First, a concave for embedding an optical recording material is formed in a card substrate such as polyethylene terephthalate and white rigid polyvinyl chloride by a hot pressing process or the like. If necessary, the card substrate surface including the concave is subjected to primer treatment for adhesion.

The thus formed optical recording material is embedded in the concave of the card substrate, and a transparent polycarbonate film having, for example, a hot-melt adhesive layer at one surface thereof is superposed thereon. The laminate is pressed by means of a hot-fixing roll heated to from about 90° to 150° C. to produce an optical card.

Optionally, an optical card can be produced by previously affixing the thus formed optical recording material to a card protective layer such as transparent polyvinyl chloride via an adhesive layer; superposing the resulting laminate on the card substrate having a concave previously formed by a hot pressing process or the like, via an adhesive layer so that the optical recording material is embedded in the concave; and then pressing the laminate by means of a heated roll.

Another examples of the optical card of the present invention will be illustrated with reference to an embodiment shown in FIG. 5.

Figure 5:
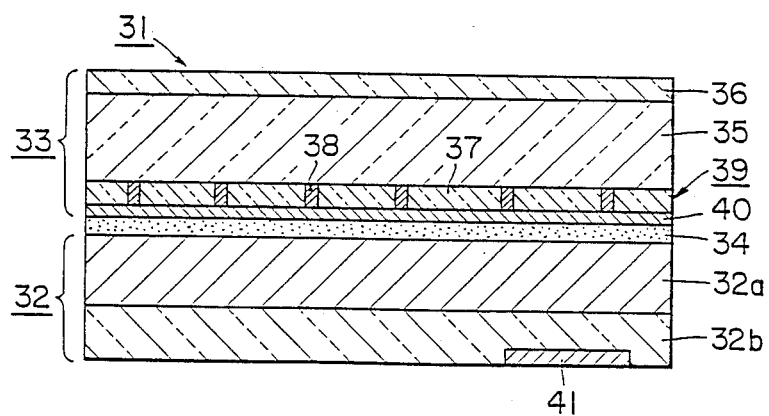

An optical card 31 of the present invention comprises, as can be seen from the section of FIG. 5, a substrate 32 and an optical recording part 33, both being interposed by an adhesive layer and being bonded into an integral body.

The optical recording part 33 is formed of a laminate comprising: an optical recording substrate 35; a cured layer 36 being provided on the upper surface of the substrate 35; a recording layer 39 provided on the lower surface of the substrate 35, the layer 39 consisting of light transmissive portions 37 and light screening portions; and a reflective metallic thin film layer 40. Information can be written in the metallic thin film layer so as to work as a second recording layer by using low melting point metals such as Te, Zn, Pb and the like for the metallic thin film layer. When information is not desired to write in the metallic layer, reflective metals such as Al, Cr and the like are used as described above.

On the other hand, the substrate 32 is formed of a laminate consisting of an opaque material layer 32a and a transparent material layer 32b. White rigid polyvinyl chloride is preferably used as the opaque material layer 32a and transparent rigid polyvinyl chloride is preferably used as the transparent material layer 32b.

In some cases, a magnetic recording layer 41 may be provided in the transparent material layer 32b. A (first) recording layer 39 and the metallic thin layer 40 may be provided on a partial surface of the optical recording substrate 35 instead of the entire surface thereof. Further, according to necessity, such things may be additionally provided on the surface or the back of the optical card as IC memories, photographs, sculptured images, characters, marks, relief characters so called imprint and the like.

Figure 6:
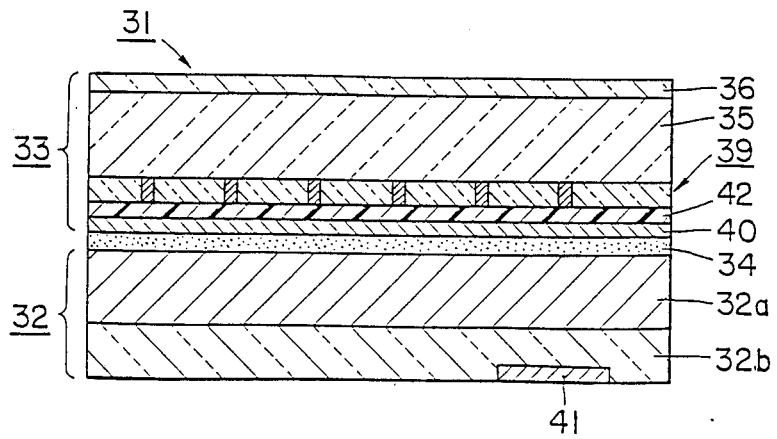

In an optical card 31 of another embodiment shown in FIG. 6, a barrier layer 42 is provided between a recording layer 39 and a metallic thin film layer 40 of an optical recording portion 33. Other construction is the same as the optical card of FIG. 5. This barrier layer 42 is provided in order to prevent the deterioration of the metallic thin film layer 40 due to temperature change. This barrier layer is particularly effective when the photosensitive material of the (first) recording layer is a hygroscopic material.

A cured surface layer 36 is to increase the surface hardness of the optical card 31 at the side of optical recording portion to protect the same thereby preventing the card from being scratched during bearing or usage thereof. Thus, the card can be improved in durability and in confidence of accuracy of writing and reading.

Examples of the cured surface layer are any type of curing agents such as silicones, acrylates, melamines, urethanes, epoxides; metallic oxide such as $Al_2O_3$, $SiO_2$ and the like; or plasma polymerized membrane and the like.

A barrier layer 42 is provided so that the photosensitive material forming the (first) recording layer 39 may not have physical and chemical adverse effect on the second recording layer or metallic thin layer 40. Particularly when the photosensitive material of the (first) recording layer is hygroscopic, the barrier layer is effective to prevent the second recording layer from deterioration at an elevated temperature or an elevated moisture.

Examples of the material for barrier layer are acrylates, melamines, urethanes, celluloses, polyethylene, polyvinyl chloride, polyvinylidene chloride, metallic oxides such as $Al_2O_3$, $SiO_2$ and the like, and plasma polymerized membrane.

As an adhesive forming an adhesive layer 34, a variety of adhesives can be employed as exampled by thermosetting adhesives such as polyurethanes, epoxides and the like, or heat sensitive adhesive such as acrylate resins, polyvinyl acetate resins, polyethylene/vinyl acetate copolymers and the like. For the application requiring chemicals resistance, thermosetting adhesives, preferably urethanes adhesives are used.

The present invention also relates to an optical card wherein data readout is optically carried out by a line sensor.

Recently, cards using a magnetic medium have been widespread. In order to carry out higher density data recording, cards containing IC memory and optical data recording cards have been developed.

A large amount of data are recorded in the optical data recording cards, and it is suitable to use a line sensor to rapidly read out. That is, the line sensor can monitor elongated regions to read out the data in the region and can simultaneously read out one row of data.

It is necessary that the situation and pose relations between the data recording regions of the card and the line sensor be accurately conformed. If the predetermined relations are not ensured, then readout cannot be carried out.

The present invention provides an optical data recording card having means capable of accurately conforming the situation and pose relation against the line sensor.

In order to achieve this object, a predetermined portion of a data recording region is provided with bars disposed in a direction coinciding with a data readout direction of a line sensor, and these bars are detected by means of the line sensor to accurately maintain the situation and pose relations between a card and the line sensor.

Embodiments of the present invention will be described with reference to FIGS. 7, 8 and 9.

Figure 9:
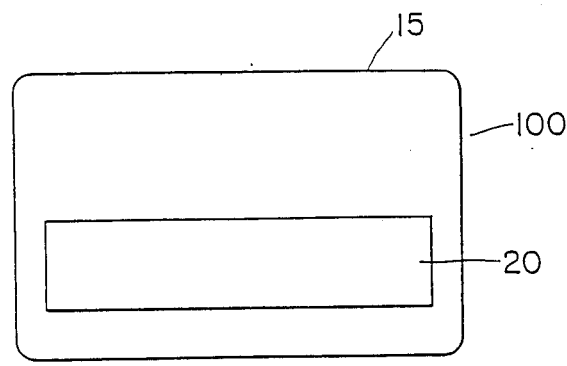
FIG. 9 is a plan view of an optical card according to the present invention.

FIG. 9 is a plan view of an optical data recording card according to the present invention. A card 100 made of plastics or the like is provided with a printing region 15 of letters and patterns and an optical data recording region 20.

Figure 7:
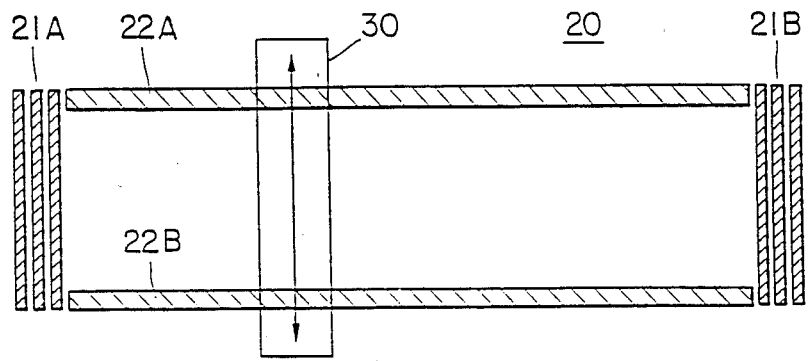
FIG. 7 is a schematic view of an optical card having bars of one type according to the present invention.

FIG. 7 is a view of a further embodiment of the present invention, and shows an enlarged optical data recording region 20 shown in FIG. 9. Longitudinally extending bars 21A and 21B having a length approximately equal to the longitudinal length of a laterally elongated rectangular region are provided three by three at both the left side and the right side of the laterally elongated rectangular region. A lateral bar 22A is provided in order to connect an upper end of the bar 21A with an upper end of the bar 21B and a lateral bar 22B is provided in order to connect a lower end of the bar 21A with a lower end of the bar 21B. The data are recorded at the region surrounded by these longitudinal bars 21A and 21B and lateral bars 22A and 22B.

The data are read out by means of a line sensor 30. The line sensor 30 performs data readout in a direction shown by an arrow. If the card is set against the line sensor so that the arrow overlaps the longitudinal bars 21A and 21B, then the card and the line sensor exhibit an accurate situation relation and an accurate pose relation. In this case, if the line sensor moves laterally parallel, then data can be accurately read out.

Figure 8:
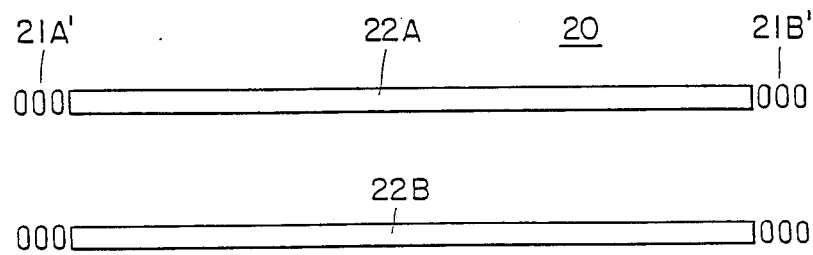
FIG. 8 is a schematic view of an optical card having bars of another type according to the present invention.

FIG. 8 is a view of a still further embodiment of the present invention. Longitudinal bars 21A' and 21B' are disposed at only the portions extending from lateral bars 22A and 22B. Because the longitudinal bars are provided in order to examine whether they coincide with the data readout direction of the line sensor or not, the presence of two portions of each longitudinal bar is satisfactory. If such two portions are spaced apart from each other as far as possible, good precision can be obtained. The longitudinal bars 21A' and 21B' are provided at the portions corresponding to both the ends of the embodiment of the longitudinal bars 21A and 21B shown in FIG. 5.

While the longitudinal bars are provided at the sides of the lateral bars by three by three (3 pairs) in the embodiment described above, the longitudinal bars may be provided at the sides of the lateral bars one by one (one pair). If the set situation of the card is predetermined, the pose may be controlled by only longitudinal bars disposed at either the right or left side of the card, and the other longitudinal bars may simply exhibit the data recording region. While each of the lateral bars 22A and 22B is one bar having a relatively wide width, the lateral bars show the upper and lower lines of the data recording regions and therefore the form of the lateral bars are not limited to the embodiments illustrated.

As described above, the longitudinal bars for examining the situation and pose relations between the card and the line sensor are provided at the predetermined portion of the optical data recording region, and therefore accurate data readout is ensured by detecting the longitudinal bars by means of the line sensor. Thus, the present invention improve the convenience in using the optical data recording card.

While the present invention is illustrated by the following examples, the present invention is not limited thereto.

EXAMPLE 1

A coating solution for forming a photosensitive material layer comprising the following ingredients was prepared. This coating solution was applied onto a previously undercoated polyester film having a film thickness of 188 micrometers (Lumirror Q-82 available from Toray, Japan) by a Mayer bar #36 while maintaining at 35° C., and then cooled to a temperature of 5° C. The treated film was then dried at a temperature of 30° C., and film-hardening treatment was carried out for 12 hours at a temperature of 40° C. to form a photosensitive material layer on the substrate. The coating weight of the coating solution for forming the photosensitive material layer was 4 grams per square meter on a dry basis.

Composition of a Coating Solution for Forming a Photosensitive Material Layer

| | |
|---|---|
| Gelatin (P-2151 available from Nitta Gelatin, Japan); 8% aqueous solution | 25.0 grams |
| HCl acidic aqueous solution of $PdCl_2$ (Red Sumer, ten-fold solution available from Nippon Kanizen, Japan) | 14.0 grams |
| 4-Morpholino-2,5-dibutoxybenzene-diazonium borofluoride (DH 300 BFu available from Daito Kagaku, Japan); 2% DMF solution | 3.0 grams |
| Condensation product of p-diazo-diphenylamine borofluoride and paraformaldehyde; 5% DMF solution | 0.7 gram |
| N,N'—Dimethylolurea; 5% aqueous solution | 0.5 gram |

The photosensitive material layer thus formed was then brought into intimate contact with the mask surface of a photomask wherein lines having a width of 5 micrometers were negatively patterned in the form of stripes having a pitch of 10 micrometers. The whole was exposed for 60 seconds to an ultra-high mercury vapor lamp (3 kW; distance of one meter) from the photomask side. The exposure amount was 50 mj/cm$^2$ at a wavelength of 365 nanometers.

The thus imagewise exposed photosensitive material layer was then immersed in treating solutions (A) and (B) having the following compositions in this order for 40 seconds and 100 seconds, respectively. (The treatment temperature was 25° C.)

(A) Siba Nickel (manufactured by Okuno Seiyaku, Japan)

| | |
|---|---|
| Boron-type reducing agent | 0.5 gram |
| Nickel sulfate | 3.0 grams |
| Sodium citrate | 1.0 gram |
| Water | 95.5 grams |

(B) 1:1 Mixture of TMP Chemical Nickel A and TMP Chemical Nickel B

| | |
|---|---|
| Nickel sulfate | 9.0 grams |
| Sodium hypophosphite | 7.0 grams |
| NH$_3$ Aqueous solution (28%) | 6.5 grams |
| Sodium citrate | 10 0 grams |
| Water | 67.5 grams |

Thereafter, the whole was washed with water and dried to obtain a first recording layer having light transmissive portions and black positive patterns corresponding light screening portions.

A Te-Cu-Pb alloy (at an atomic percent ratio of 80:15:5) was then subjected to sputtering for 90 seconds as a sputter target onto the first recording layer thus formed on the substrate under an argon gas pressure of $5 \times 10^{-2}$ torr and a placing pressure of 400 V to deposit a Te-Cu-Pb metallic thin film layer having a film thickness of 300 Angstroms, thereby forming a second recording layer.

The thus obtained optical recording material was then irradiated with a laser beam having a wavelength of 790 nanometers oscillated from a laser diode from the recording layer-free side above under the following conditions: the black positive patterns already formed on the first recording layer was used as a guide (tracking); the laser beam was focused on the surface of the Te-Cu-Pb metallic thin film layer under a power of 5 mW at a beam diameter of 2 micrometers; and the pulse width was one nanosecond. Circular recording pits having a diameter of 2 micrometers were formed in the metallic thin film layer.

EXAMPLE 2

A coating solution for forming a photosensitive material layer comprising the following ingredients was prepared. This coating solution was applied to a previously corona-treated triacetate film having a film thickness of 18 micrometers (Fujitack available from Fuji Shashin, Japan) by means of a Mayer bar #36 while warming to 35° C., and then cooled to a temperature of 5° C. The whole was then dried at a temperature of 30° C. and a film-hardening reaction was carried out for 3 hours at a temperature of 40° C. The dry weight of the resulting photosensitive material layer was 3.6 grams per square meter.

Composition of a Coating Solution for Forming a Photosensitive Material Layer

| | |
|---|---|
| Gelatin (#150 available from Nitta Gelatin, Japan); 7% aqueous solution | 28.6 grams |
| HCl acidic aqueous solution of complex of $PdCl_2$ and EDTA (1000 ppm on a $PdCl_2$ basis; pH = 2.8) | 14.0 grams |
| 4-Morpholino-2,5-dibutoxybenzene-diazonium borofluoride (DH 300 BFu available from Daito Kagaku, Japan); 2% DMF solution | 3.0 grams |
| Diazoresin (D-011 available from Sinko Giken, Japan); 5% aqueous solution | 0.7 gram |
| N,N'—Dimethylolurea; 5% aqueous solution | 2.0 grams |
| 1N HCl | 2.5 grams |

The photosensitive material layer thus obtained was imagewise exposed in the same manner as described in Example 1, and then immersed in the treating solutions (A) and (B) (20° C.) in this order for 30 seconds and 90 seconds, respectively to obtain a first recording layer having light transmissive portions and black positive patterns corresponding to light screening portions.

Te was then deposited on the first recording layer thus formed on the substrate to a film thickness of 250 Angstroms to form a second recording layer.

The thus obtained optical recording material was then irradiated with a He-Ne laser beam having a wavelength of 632.8 nanometers from the recording layer-free side under the following conditions: the black positive patterns already formed on the first recording layer was used as a guide (tracking); the laser beam was focused on the surface of the Te metallic thin film layer under a power of 5 mW at a beam diameter of 3 micrometers; and the pulse width was 150 nanometers. Circular recording pits having a diameter of 3 micrometers were formed in the metallic thin film layer.

Recording pits of the recording material having written information were then photographed from the recording layer-free side of the substrate via a microscope by means of a CCD camera (TM1300 available from Toshiba, Japan). When it was converted into an electrical signal, an input signal during recording was confirmed.

EXAMPLE 3

An aqueous solution comprising the following ingredients was applied to a previously corona-treated polyester film (Lumirror T100 available from Toray, Japan; 100 microns thick) to a dry weight of 4.0 grams. The whole was dried and film-hardening treatment was carried out for 12 hours at a temperature of 40° C.

Composition of a Coating Solution

| | |
|---|---|
| Gelatin (P-2151 available from Nitta Gelatin, Japan); 30% aqueous solution | 10 grams |
| Glutaric acid; 10% aqueous solution | 1.2 grams |

A coating solution for forming a photosenstive material layer comprising the following ingredients was then prepared, and applied to the surface of the gelatin layer of the above film by means of a Mayer bar #12. The whole was dried for 10 minutes at a temperature of 70° C. to prepare a photosensitive material layer.

Composition of a Coating Solution for Forming a Photosensitive Material Layer

| | |
|---|---|
| HCl acidic aqueous solution of PdCl$_2$ (Red Sumer, ten-fold solution available from Nippon Kanizen, Japan) | 10 grams |
| Diazoresin (D-011 available from Sinko Giken, Japan) | 0.6 gram |
| Surfactant (Elmabon T-40 available from Tohho Kagaku, Japan) | 0.1 gram |
| Water | 60 grams |

The thus obtained photosensitive material layer was imagewise exposed in the same manner as described in Example 1, and immersed in solutions (A) and (B) at 25° C. in this order for 30 seconds and 60 seconds, respectively to obtain a first recording layer having light transmissive portions and black positive patterns corresponding to light screening portions.

Thereafter, an optical recording material was prepared in the same manner as described in Example 1.

EXAMPLE 4

An optical recording material was prepared in the same manner as described in Example 2 except that diazoresin was replaced with a 5% DMF solution of the condensation product of p-diazodiphenylamine borofluoride and paraformaldehyde.

EXAMPLE 5

An optical recording material was prepared in the same manner as described in Example 1 except that the substrate and the photosensitive material layer provided thereon were replaced with a Minicopyfish Film HR II manufactured by Fuji Shashin Film K.K., Japan. The Minicopyfish Film HR II comprises a polyethylene terephthalate film as a substrate, and a silver halide emulsion layer formed thereon.

EXAMPLE 6

An optical recording material was prepared in the same manner as described in Example 1 except that the substrate and the photosensitive material layer provided thereon were replaced with a Fuji Diazo Film M-4208-P7 manufactured by Fuji Shashin Film K.K., Japan. The Fuji Diazo Film M-4208-P7 comprises a polyethylene terephthalate film as a substrate, and a coating of a binary system of a diazonium salt and a coupler provided on the substrate.

EXAMPLE 7

A coating solution forming a photosensitive material layer comprising the following ingredients was prepared. This coating solution was applied to a polyester film having a film thickness of 188 micrometers (Lumirror #100 available from Toray, Japan) by means of a wire bar #36, and dried in an oven at 80° C. to form a photosensitive material layer having a film thickness of 4 micrometers.

Composition of a Coating Solution for Forming a Photosensitive Material Layer

| | |
|---|---|
| Acrylic acid/vinyl acetate copolymer resin (Corponiel Pc-50M(H) available from Nippon Gosei Kagaku Kogyo, Japan); 20% ethanolic solution | 20 grams |
| 4-Morpholino-2,5-dibutoxybenzene-diazonium borofluoride (No. 11 BFu available from Recipe Chemical); 10% MEK solution | 3.0 grams |
| PdCl$_2$ solution (PdCl$_2$:concentrated hydrochloric acid:ethanol = 0.1:5:100) | 10 grams |
| Polyethylene oxide (PEO-3 available from Seitetsu Kagaku, Japan); 1% ethanolic solution | 2.0 grams |
| p-Toluenesulfonic acid; 5% ethanolic solution | 1.0 gram |

The photosensitive material layer thus formed was then brought into intimate contact with the mask surface of a photomask wherein lines having a width of 5 micrometers were negatively patterned in the form of stripes having a pitch of 10 micrometers. The whole was exposed for 60 seconds to an ultra-high mercury vapor lamp (3 kW, distance of one meter) from the side of the photomask. The exposure amount was 50 mj/cm$^2$ at a wavelength of 365 nanometers.

The thus imagewise exposed photosensitive material layer was then immersed in the treating solutions (A) and (B) described in Example 1 in this order for 40 seconds and 100 seconds, respectively. (The treatment temperature was 25° C.)

Thereafter, the whole was washed with water and dried to obtain a recording layer having light transmissive portions and black positive patterns corresponding to light screening portions.

The photomask patterns used herein were those wherein data comprising laid out addresses and guidelines were represented in dot array of circles having a diameter of 5 micrometers.

Al was deposited on the thus patterned recording layer to a film thickness of 1500 Angstroms to form a reflective metallic thin film layer. Thus, an optical recording material was obtained.

When the optical recording material was irradiated with a beam of laser diode (7900 Angstroms) from the substrate side to read out a reflected light of the circle dot array using the black layer corresponding to the light screening portions of the recording layer as a guide line, it was confirmed to be identical with data input signal of the mask original plate.

EXAMPLE 8

A coating solution for forming a photosensitive material layers comprising the following ingredients was prepared. This coating solution was applied to a previously corona-treated triacetate film having a film thickness of 100 micrometers (Fujitack available from Fuji Shashin Film, Japan) by means of a Mayer bar #36 while warming to 35° C., and then cooled to a temperature of 5° C. The whole was then dried at a temperature of 30° C. and a film-hardening reaction was carried out for 3 hours at a temperature of 40° C. The dry weight of the resulting photosensitive material layer was 3.6 grams per square meter.

Composition of a Coating Solution for Forming a Photosensitive Material Layer

| | |
|---|---|
| Gelatin (#150 available from Nitta Gelatin, Japan); 7% aqueous solution | 28.6 grams |
| HCl acidic aqueous solution of complex of $PdCl_2$ and EDTA (1000 ppm on a $PdCl_2$ basis; pH = 2.8) | 14.0 grams |
| 4-Morpholino-2,5-dibutoxybenzenediazonium borofluoride (DH 300 BFu available from Daito Kagaku, Japan); 2% DMF solution | 3.0 grams |
| Diazoresin (D-011 available from Sinko Giken, Japan); 5% aqueous solution | 0.7 gram |
| N,N'—Dimethylolurea; 5% aqueous solution | 2.0 grams |
| 1N HCl | 2.5 grams |

The photosensitive material layer thus obtained was imagewise exposed in the same manner as described in Example 7, and then immersed in the treating solutions (A) and (B) (20° C.) in this order for 30 seconds and 90 seconds, respectively to form a recording layer having light transmissive portions and black positive patterns corresponding to light screening portions.

Al was then deposited on the recording layer thus formed on the substrate to a film thickness of 3000 Angstroms to form a reflective recording layer. Thus, an optical recording material was obtained.

EXAMPLE 9

An optical recording material was prepared in the same manner as described in Example 8 except that diazoresin was replaced with a 5% DMF solution of the condensation product of p-diazodiphenylamine borofluoride and paraformaldehyde.

EXAMPLE 10

An optical recording material was prepared in the same manner as described in Example 7 except that the substrate and the photosensitive material layer provided thereon were replaced with a Minicopyfish Film HR II manufactured by Fuji Shashin Film K.K., Japan. The Minicopyfish Film HR II comprises a polyethylene terephthalate film as a substrate, and a silver halide emulsion layer formed thereon.

EXAMPLE 11

An optical recording material was prepared in the same manner as described in Example 7 except that the substrate and the photosensitive material layer provided thereon were replaced with a Fuji Diazo Film M-4208-P7 manufactured by Fuji Shashin Film K.K., Japan. The Fuji Diazo Film M-4208-P7 comprises a polyethylene terephthalate film as a substrate, and a coating of a binary system of a diazonium salt and a coupler provided on the substrate.

EXAMPLE 12

First, an optical recording material used in forming an optical card was prepared as follows:

A coating solution for forming a diazo photosensitive material layer comprising the following ingredients was applied onto a previously undercoated transparent polyvinyl chloride film having a film thickness of 400 micrometers by means of a Mayer bar #36, and then dried. The coating weight of the coating solution for forming the photosensitive material layer was 1.5 grams per square meter on a dry basis.

Composition of a Coating Solution for Forming a Photosensitive Material Layer

| | |
|---|---|
| 4-Morpholinobenzenediazonium borofluoride | 25 grams |
| $\alpha,\beta$-bis(m-hydroxyphenoxy)ethane | 32 grams |
| 5-Sulfosalicylic acid | 20 grams |
| Citric acid | 5 grams |
| Formic acid | 200 milliliters |
| Methyl cellosolve | 600 milliliters |
| Methyl cellosolve acetate | 100 milliliters |

The photosensitive material layer thus formed was then brought into intimate contact with the mask surface of a photomask wherein lines having a width of 5 micrometers were negatively patterned in the form of stripes having a pitch of 10 micrometers. The whole was exposed for 60 seconds to an ultrahigh mercury vapor lamp (3 kW; distance of one meter) from the photomask side. After exposure, it was developed with an ammonia gas.

A Te-Cu-Pb alloy (at an atomic percent ratio of 80:17:3) was then subjected to sputtering for 90 seconds as a sputter target onto the first recording layer thus formed on the substrate under an argon gas pressure of $5 \times 10^{-2}$ torr and a placing pressure of 400 V to deposit a Te-Cu-Pb metallic thin film layer having a film thickness of 300 Angstroms, thereby forming a second recording layer. Thus, an optical recording material was formed. On the other hand, a desired printing composition was applied to the front surface of a white rigid polyvinyl chloride film having a thickness of 300 micrometers as a card substrate, and magnetic stripes were provided on the back surface thereof by a transfer process.

The card substrate and the optical recording material were laminated via a hot-melt adhesive layer (vinyl chloride-vinyl acetate-maleic acid resin) so that the second recording layer of the optical recording material came into contact with the surface of the card substrate. The laminate was pressed by a heated roll at 120° C. to produce an optical card.

EXAMPLE 13

An optical recording material used in forming an optical card was prepared in the same manner as described in Example 7 except that a photosensitive material layer was formed as follows:

A coating composition for forming a photosensitive material layer comprising the following ingredients maintained at 35° C. was applied onto a previously undercoated polycarbonate film having a film thickness of 300 micrometers by means of a Mayer bar #36, and then cooled to a temperature of 5° C. The whole was dried at a temperature of 30° C., and film-hardening treatment was carried out for 12 hours at a temperature of 40° C. to form a photosensitive layer on the substrate. The coating weight of the coating solution for forming the photosensitive material layer was 4 grams per square meter on a dry basis.

Composition of a Coating Solution for Forming a Photosensitive Material Layer

| | |
|---|---|
| Gelatin (P-2151 available from Nitta Gelatin, Japan); 8% aqueous solution | 25.0 grams |
| HCl acidic aqueous solution of PdCl$_2$ (Red Sumer, ten-fold solution available from Nippon Kanizen, Japan) | 14.0 grams |
| 4-Morpholino-2,5-dibutoxybenzene-diazonium borofluoride (DH 300 BFu available from Daito Kagaku, Japan); 2% DMF solution | 3.0 grams |
| Condensation product of p-diazodiphenyl-amine borofluoride and paraformaldehyde; 5% DMF solution | 0.7 gram |
| N,N'—Dimethylolurea; 0.5% aqueous solution | 0.5 gram |

This optical recording material is one wherein no information is written in the reflective metallic thin film layer and information written in the first recording layer is read out.

Further, an acrylate resin (Daiyanal LR 90 available from Mitsubishi Rayon, Japan) was applied as a protective film onto the reflective metallic thin film layer by a screen printing process.

The optical recording material thus obtained was then immersed in warm water, and the gelatin layer at the portions having no protective layer was removed. The material was then dried to prepare an optical recording material provided with the first and second recording layers at an only central portion rather than the entire surfaces of the substrate for the optical recording material.

On the other hand, a white polyvinyl chloride film having a thickness of 400 micrometers as a card substrate and the thus prepared optical recording material were laminated via an epoxy resin adhesive so that the second recording layer of the optical recording material came into contact with the card substrate. The laminate was pressed by means of a roll or the like to produce an optical card.

EXAMPLE 14

An optical card was produced in the same manner as described in Example 13 from an optical recording material which was obtained in the same manner as described in Example 2 except that the thickness of the triacetate film was 100 micrometers. The resulting optical card was irradiated with a He-Ne laser beam having a wavelength of 632.8 nanometers from the side of the substrate for the optical recording material under the following conditions: the black positive patterns already formed in the first recording layer was used as a guide (tracking); the laser beam was focused on the surface of the Te metallic thin film layer described above under a power of 5 mW at a beam diameter of 3 micrometers; and the pulse width was 150 nanoseconds. Circular recording pits having a diameter of 3 micrometers were formed in the metallic thin film layer.

EXAMPLE 15

An optical card was produced in the same manner as described in Example 12 except that an optical recording material embedded in the optical card was prepared in the same manner as described in Example 7.

In this example, in preparing the photosensitive material layer of the optical recording material, a coating solution for forming the photosensitive material layer was applied to a polycarbonate film having a film thickness of 300 micrometers (manufactured by Teijin Kasei, Japan) by means of a wire bar #12 and dried in an 80° C. oven to form the photosensitive material layer having a film thickness of 4 micrometers.

This optical recording material is one wherein no information is written in the reflective metallic thin film layer and information written in the first recording layer is read out.

When the optical card having embedded the optical recording material therein was irradiated with a beam of a laser diode (7900 Angstroms) from the side of the substrate for the optical recording material to read out a reflected light of circular dot array using the black layer corresponding to the light screening portions of the first recording layer as a guideline, it was confirmed to be identical with a data input signal of a mask original plate.

EXAMPLE 16

An optical recording material was prepared and then an optical card was produced in the same manner as described in Example 13 except that the substrate and the photosensitive material layer provided thereon were replaced with a Minicopyfish Film HR II manufactured by Fuji Shashin Film K.K., Japan. The Minicopyfish Film HR II comprises a polyethylene terephthalate film as a substrate, and a silver halide emulsion layer formed thereon.

EXAMPLE 17

An optical recording material was prepared and then an optical card was produced in the same manner as described in Example 13 except that the substrate and the photosensitive material layer provided thereon were replaced with a Fuji Diazo Film M-4208-P7 manufactured by Fuji Shashin Film K.K., Japan. The Fuji Diazo Film M-4208-P7 comprises a polyethylene terephthalate film as a substrate, and a coating of a binary system of a diazonium salt and a coupler provided on the substrate.

EXAMPLE 18

An optical recording material embedded in an optical card was prepared in the same manner as described in Example 1.

On the other hand, a white rigid polyvinyl chloride film having a thickness of 400 micrometers as a card substrate was subjected to hot pressing to form a concave for embedding the optical recording material. One surface of a transparent polycarbonate film having a thickness of 300 micrometers as a card protective layer was provided with a hot-melt adhesive (Pracsel H-7 available from Daisel Kagaku Kogyo, Japan), and the other surface was treated with a silicon surface hardening agent.

The optical recording material was then embedded in the concave of the white rigid polyvinyl chloride card substrate, and the card protective layer was superposed on the card substrate having embedded the optical recording material therein, via the adhesive layer. They were pressed by means of a heated roll having a surface temperature of 120° C. to laminate them.

The thus obtained optical card was then irradiated with a laser beam having a wavelength of 790 nanometers oscillated from a laser diode, from the card protective layer side under the following conditions: the black positive patterns already formed on the first recording layer was used as a guide (tracking); the laser beam was focused on the surface of the Te-Cu-Pb metallic thin film layer under a power of 5 mW at a beam diameter of 2 micrometers; and the pulse width was one nanosecond. Circular recording pits having a diameter of 2 micrometers were formed in the metallic thin film layer.

EXAMPLE 19

An optical recording material prepared in the same manner as described in Example 18 was affixed to a white polyvinyl chloride film having a thickness of 400 micrometers as a card protective layer via a double-sided adhesive tape (Double Tack Tape 565 available from Sekisui Kagaku Kogyo, Japan). The entire surface of the card protective layer having affixed the optical recording material thereto was provided with a vinyl chloride-vinyl acetate-maleic acid resin layer (Eslec M available from Sekisui Kagaku Kogyo, Japan).

On the other hand, a white rigid polyvinyl chloride film having a thickness of 300 micrometers as a card substrate was subjected to hot pressing to form a concave for embedding the optical recording material. The card substrate and the card protective layer having affixed the optical recording material thereto were laminated via an epoxy resin adhesive (Epikote 828, Epomate 001 available from Yuka Shell Epoxy) so that the optical recording material affixed to the card protective layer was embedded in the concave. The laminate was then pressed to form an optical card.

EXAMPLE 20

An optical card was produced in the same manner as described in Example 18 except that an optical recording material embedded in an optical card was prepared in the manner as described in Example 2 and a triacetate film had a film thickness of 100 micrometers.

The optical card obtained was then irradiated with a He-Ne laser beam having a wavelength of 632.8 nanometers from the card protective layer side under the following conditions: the black positive patterns already formed on the first recording layer was used as a guide (tracking); the laser beam was forcused on the surface of the Te metallic thin film described above under a power of 5 mW at a beam diameter of 3 micrometers; and the pulse width was 150 nanoseconds. Circular recording pits having a diameter of 3 micrometers were formed in the metallic thin film.

EXAMPLE 21

An optical card was produced in the same manner as described in Example 18 except that an optical recording material embedded in the optical card was prepared in the same manner as described in Example 7.

This optical recording material is one wherein no information is written in the reflective metallic thin film layer and information written in the first recording layer is read out.

When the optical card having embedded the optical recording material therein was irradiated with a beam of a laser diode (7900 Angstroms) from the card protective layer side to read out a reflected light of circular dot array using the black layer corresponding to the light screening portions of the first recording layer as a guideline, it was confirmed to be indential with a data input signal of a mask original plate.

EXAMPLE 22

An optical recording material was prepared and then an optical card was produced in the same manner as described in Example 18 except that the substrate and the photosensitive material layer provided thereon were replaced with a Minicopyfish Film HR II manufactured by Fuji Shashin Film K.K., Japan. The Minicopyfish Film HR II comprises a polyethylene terephthalate film as a substrate, and a silver halide emusion layer formed thereon.

EXAMPLE 23

An optical recording material was prepared and then an optical card was produced in the same manner as described in Example 18 except that the substrate and the photosensitive material layer provided thereon were replaced with a Fuji Diazo Film M-4208-P7 manufactured by Fuji Shashin Film K.K., Japan. The Fuji Diazo Film M-4208-P7 comprises a polyethylene terephthalate film as a substrate, and a coating of a binary system of a diazonium salt and a coupler provided on the substrate.

EXAMPLE 24

A white rigid polyvinyl chloride film having a thickness of 300 micrometers as a card substrate was subjected to hot pressing to form a concave for embedding an optical recording material.

The optical recording material prepared in the same manner as described in Example 18 was embedded in the concave formed in the card substrate described above so that the second recording layer of the optical recording material came into contact with the card substrate.

A transparent polyvinyl chloride film having a thickness of 400 micrometers as a card protective layer was then superposed thereon, and thereafter the stack was subjected to heat and pressure for 30 minutes at a temperature of 150° C. under a pressure of 120 kg/cm$^2$ by means of a pressing machine to integrate it. Thus, an optical card was produced.

EXAMPLE 25

On a polycarbonate film having a thickness of 400 micrometers was applied gravure coating of a primer (Primer PC-4 available from Shinetsu Kagaku). Then, gravure coating of a silicone type surface hardening agent (X-12-2150 available from Shinetsu Kagaku, Japan) was applied thereon to be subjected to curing at 100° C. for one minute for obtaining a surface cured layer. On the back surface of said polycarbonate film was applied gravure coating of photosensitive material layer forming coating solution having the following compositions. The amount of photosensitive material layer forming coating solution applied was 3 g/m² at a dried state.

Composition of a Coating Solution for Forming a Photosensitive Material Layer

| | |
|---|---|
| 10% methyl ethyl ketone solution of poly-vinylmethylether maleic anhydride (Gantletz AN 139 available from G.A.F. Corp) | 20 parts by weight |
| 20% methyl ethyl ketone solution of poly(vinyl acetate) (Esneal C-2 available from Sekisui Kagaku, Japan) | 20 parts by weight |
| 25% methyl cellosolve solution of acrylate type resin (L-40 available from Soken Kagaku, Japan) | 12 parts by weight |
| 0.1% methyl cellosolve solution of palladium chloride (PdCl$_2$/conc. hydrochloric acid/methyl cellosolve = 1/10/1000) | 38 parts by weight |
| 10% methyl cellosolve solution of 4-morpholino-2,5-dibutoxybenzene diazonium borofluoride (DH 300 BF$_4$ available from Daito Kagaku, Japan) | 10 parts by weight |

The photosensitive material layer thus formed was then brought into close contact with the mask surface of a photomask wherein lines, in which dots having a length of 15 micrometers and a width of 5 micrometers were lined at a pitch of 15 micrometers, were negatively patterned in the form of stripes having a pitch of 20 micrometers. The whole was exposed for 10 seconds to an ultra-high pressure mercury vapor lamp (3 kW; distance of one meter) from the photomask side. The photomask pattern used herein was obtained by photo etching method. This was done in such a manner that a Cr thin layer was provided on a glass plate by means of sputtering followed by applying photoresist (AZ 1350 available from Shipley) thereon to be dried. Onto the dried surface was irradiated He-Cd laser at a beam diameter of 2 micrometers on a position controlled XY stage thereby to form lines, in which dots having a length of 15 micrometers and a width of 5 micrometers were lined at a pitch of 15 micrometers, in the form of stripes having a pitch of 20 micrometers. The product thus obtained was treated with a photoresist developing solution (Shipley) to be subjected to heat treatment at 130° C. for 25 minutes followed by etching with ferric chloride solution to obtain a pattern wherein the dotted portions functioned as light transmissive portions.

The pattern exposed photosensitive material layer thus obtained was immersed into the treating solution (A) described in Example 1 and the following solution (B) in order of from A to B respectively for 60 and 80 minutes (at a treating temperature of 30° C.).

(B) 3:2:1 Mixture of TMP Non-Ammonium Chemical Nickel A. TMP Non-Ammonium Chemical Nickel B and Water.

| | | |
|---|---|---|
| Nickel sulfate | 8.0 | grams |
| Sodium hypophosphite | 5.5 | grams |
| Sodium hydroxide | 1.0 | grams |
| Sodium citrate | 3.5 | grams |
| Water | 82.0 | grams |

The immersed product was thereafter subjected to water rinsing and drying to obtain a first recording layer which had a black positive pattern corresponding to light transmissive portions and light screening portions.

On the recording layer thus patterned was applied a Te-Cu-Pb alloy (sputter target compositional ratio of a molar ratio of 80:15:5) by means of sputtering method to obtain a light recording material wherein a second recording layer was formed. In this case, the Te-Cu-Pb thin layer was not formed at the peripheral portions of the recording layer.

A card substrate was prepared as follows: First, a white rigid polyvinyl chloride (a thickness of 200 micrometers) was provided on both the sides thereof with a pattern such as character or design by screen printing method. Another transparent rigid polyvinyl chloride (A thickness of 100 micrometers) was provided on the single surface thereof with a magnetic recording layer with a width of 6.5 mm. The other surface thereof was laminated on the above printed white polyvinyl chloride to be subjected to hot pressing at 140° C. for 30 minutes between two sheets of stainless steel under a press machine so as to obtain a card substrate.

The optical recording material and card substrate respectively thus prepared were laminated in such a manner that the second recording layer of the optical recording material faced the surface (printed side) of white polyvinyl chloride of the card substrate with urethane resin adhesives (mixture of Arbon EU-4200 and EHU4200 of a ratio of 10:1 available from Alps Kagaku Sangyo, Japan) interposed therebetween, thereby to be subjected to roller pressing. The pressed product was rested for 24 hours and then cut by means of a cutting die to obtain an optical card.

EXAMPLE 26

On a patterned first recording layer which was obtained similarly as Example 25, a melamine type resin (Tough coat 112 available from Dai Nippon Ink Kagaku Kogyo, Japan) was applied to be subjected to heat treatment at 120° C. for 3 minutes to form a barrier layer (a thickness of 3 micrometers). On the barrier layer thus formed was formed a second recording layer by sputtering a Te-Cu-Pb alloy (sputter target compositional ratio of a molar ratio of 80:15:5) to obtain an optical recording material. In this case, the Te-Cu-Pb thin layer was not formed at the peripheral portions of the recording layer.

A card substrate was then prepared similarly as in Example 25. The prepared card was bonded to the above optical recording material with adhesive interposed therebetween and subjected to curing and died to obtain an optical card.

EXAMPLE 27

An optical recording material and a card substrate were prepared similarly as in Example 25 except that an reflective metallic thin layer was formed by metallizing aluminum on a patterned recording layer so that the thickness of aluminum might become 1500 Angstroms. In this case, the aluminum layer was not formed at the peripheral portions of the recording layer.

The optical recording material and card substrate respectively thus prepared were laminated in such a manner that the second recording layer of the optical recording material faced the surface (printed side) of white polyvinyl chloride of the card substrate with urethane resin adhesives (mixtures of Arbon EU-4200 and EHU4200 of a ratio of 10:1, available from Alps Kagaku Sangyo, Japan) interposed therebetween, thereby to be subjected to roller pressing. The pressed product was rested for 24 hours and then cut by means of a cutting die to obtain an otpical card.

EXAMPLE 28

On a patterned recording layer obtained similarly as in Example 25, melamine resin (Tough coat 112 available from Dai Nippon Ink Kagaku Kogyo, Japan) was applied by bar coating method to be subjected to heat treatment at 120° C. for 3 minutes to obtain a barrier layer (a thickness of 3 micrometers). Aluminum was then metallized on the barrier layer so that the thickness of aluminum layer might become 1500 Angstroms, whereby a reflective metallic thin layer formed to obtain an optical recording material. In this case, the aluminum layer was not formed at the peripheral portions of the recording layer.

A card substrate was prepared similarly as in Example 25. The card substrate thus prepared was laminated to the above optical recording material by the use of adhesives to be subjected to curing followed by die cutting to obtain an optical card.

What is claimed is:

1. An optical card comprising an optical recording material provided on a card substrate, said optical recording material comprising (a) a substrate for the optical recording material, (b) a first recording layer provided at the lower surface of said substrate for the optical recording material, said first recording layer including light transmissive portions and light screening portions, said first recording layer comprising a photosensitive material including (i) a transparent resin as a binder, (ii) a photodecomposable development restrainer having a diazo or azido group, and (iii) a metal complex compound or a metal compound which is reduced to form metal nuclei, and (c) a second recording layer provided at the lower surface of said first recording layer, said second recording layer comprising a reflective metallic thin film onto which information can be written using said light transmissive portions and said light screening portions as track information, wherein said optical recording material is provided on said card substrate so that said second recording layer comes into contact with said card substrate.

2. The optical card according to claim 1 wherein said information can be written onto said second recording layer by irradiation with an energy beam.

3. The optical card according to claim 1 wherein said second recording layer includes recording pits formed therein.

4. The optical card according to claim 1 wherein readout of information written in said first and second recording layers is carried out by irradiating the optical recording material with a record playback light from the recording layer-free side of the substrate.

5. The optical card according to claim 1 wherein said second recording layer is a metallic thin film layer composed of a metal or alloy selected from the group consisting of Te, Zn, Pb, Cd, Bi, Sn, Se, In, Ga, Rb, Te-Se, Te-Se-Pb, Te-Pb, Te-Sn-S, Sn-Cu, Te-Cu and Te-Cu-Pb.

6. The optical card according to claim 1 wherein said metal compound which is reduced to form metallic nuclei is a compound of a metal selected from the group consisting of Pd, Au, Ag, Pt and Cu.

7. The optical recording material according to claim 6 wherein said metal compound is palladium chloride.

8. The optical card according to claim 1 further comprising a card protective layer provided on said card substrate over said optical recording material.

9. In an optical card according to claim 1 having an optical data recording region at a predetermined portion of a card surface and optical data recorded in said recording region readable by means of a line sensor, the improvement which comprises bars provided at a predetermined portion of said optical data recording region in a direction coinciding with the data readout direction of said line sensor.

10. The optical card according to claim 1, wherein said thin film layer has information stored therein and said optical card further comprises a direct read after write (DRAW) medium.

* * * * *